(12) United States Patent
Lim et al.

(10) Patent No.: US 8,664,900 B2
(45) Date of Patent: Mar. 4, 2014

(54) SYSTEM FOR CONTROLLING MOTOR OF HYBRID VEHICLE

(75) Inventors: Seong Yeop Lim, Seoul (KR); Young Jun Kim, Busan (KR)

(73) Assignee: Hyundai Motor Company, Seoul (KR)

( * ) Notice: Subject to any disclaimer, the term of this patent is extended or adjusted under 35 U.S.C. 154(b) by 263 days.

(21) Appl. No.: 13/188,729

(22) Filed: Jul. 22, 2011

(65) Prior Publication Data

US 2012/0139459 A1 Jun. 7, 2012

(30) Foreign Application Priority Data

Dec. 6, 2010 (KR) ........................ 10-2010-0123712

(51) Int. Cl.
*H03K 5/00* (2006.01)

(52) U.S. Cl.
USPC .............. 318/400.2; 318/400.02; 318/400.09; 318/689; 318/721

(58) Field of Classification Search
USPC .................... 318/254, 432, 689, 721, 400.02, 318/400.09, 400.2
See application file for complete search history.

(56) References Cited

U.S. PATENT DOCUMENTS

| | | | | |
|---|---|---|---|---|
| 6,388,419 | B1* | 5/2002 | Chen et al. | 318/727 |
| 6,396,229 | B1* | 5/2002 | Sakamoto et al. | 318/400.02 |
| 6,741,060 | B2* | 5/2004 | Krefta et al. | 318/727 |
| 6,774,592 | B2* | 8/2004 | Walters et al. | 318/400.09 |
| 7,336,050 | B2* | 2/2008 | Ihm | 318/714 |
| 7,352,151 | B2* | 4/2008 | Fujitsuna et al. | 318/721 |
| 7,408,312 | B2* | 8/2008 | Itou et al. | 318/400.02 |
| 7,560,886 | B2* | 7/2009 | Kaneko et al. | 318/432 |
| 7,586,286 | B2* | 9/2009 | Cheng et al. | 318/807 |
| 7,723,944 | B2* | 5/2010 | Kitanaka et al. | 318/802 |
| 2002/0145837 | A1* | 10/2002 | Krefta et al. | 361/23 |
| 2003/0034748 | A1* | 2/2003 | Walters et al. | 318/254 |
| 2003/0057913 | A1* | 3/2003 | Matsushita et al. | 318/727 |
| 2003/0102829 | A1* | 6/2003 | Walters et al. | 318/254 |
| 2005/0140329 | A1* | 6/2005 | Ihm | 318/712 |

(Continued)

FOREIGN PATENT DOCUMENTS

| | | |
|---|---|---|
| JP | 2006067718 A | 3/2006 |
| JP | 2008-062779 A | 3/2008 |
| KR | 10-0792893 | 1/2008 |
| KR | 10-0957330 | 6/2009 |

OTHER PUBLICATIONS

Kim, B. et al., "Control Method of Permanent Magnetic Synchronous Motor for Hybrid Electric Vehicle," p. 2060-2065.

*Primary Examiner* — Paul Ip
(74) *Attorney, Agent, or Firm* — Edwards Wildman Palmer LLP; Peter F. Corless; Stephen D. LeBarron

(57) ABSTRACT

A system for controlling a motor of a hybrid vehicle that secures robustness and stability of control by selecting an optimal approximation model according to a driving condition of the motor and determines current order for controlling the motor by using the selected optimal approximation model is disclosed. In particular, a current order generator utilizes a reference current determination module to determine reference currents of the first and second axes, a compensation value determination module to determine compensation values of the reference currents of the first and second axes, and a current determination module to determine the currents of the first and second axes from the reference currents of the first and second axes and the compensation values of the reference currents of the first and second axes in order to control the motor more efficiently.

7 Claims, 4 Drawing Sheets

(56) References Cited

U.S. PATENT DOCUMENTS

| | | |
|---|---|---|
| 2006/0076832 A1* | 4/2006 | Matsushita et al. ........... 307/10.1 |
| 2007/0085508 A1* | 4/2007 | Fujitsuna et al. .............. 318/712 |
| 2007/0200528 A1* | 8/2007 | Itou et al. ....................... 318/719 |
| 2007/0248338 A1* | 10/2007 | Kaneko et al. ................. 388/823 |
| 2008/0116842 A1* | 5/2008 | Cheng et al. ................... 318/807 |
| 2008/0185983 A1* | 8/2008 | Suzuki ........................... 318/449 |
| 2008/0203958 A1* | 8/2008 | Suzuki ........................... 318/629 |
| 2008/0297077 A1* | 12/2008 | Kovudhikulrungsri et al. ........................ 318/400.02 |
| 2008/0300820 A1* | 12/2008 | Hu ................................. 702/147 |
| 2009/0015182 A1* | 1/2009 | Kariatsumari et al. .. 318/400.02 |
| 2009/0071735 A1* | 3/2009 | Kaneko et al. ........... 180/65.285 |
| 2009/0128081 A1* | 5/2009 | Yoneda et al. ................. 318/689 |
| 2009/0256518 A1* | 10/2009 | Kitanaka et al. ............... 318/802 |
| 2010/0231151 A1* | 9/2010 | Ohtani et al. ............. 318/400.09 |
| 2011/0214834 A1* | 9/2011 | Richter et al. ................. 164/417 |
| 2011/0221365 A1* | 9/2011 | Gallegos-Lopez ....... 318/400.02 |
| 2011/0221366 A1* | 9/2011 | Gallegos-Lopez et al. ........................ 318/400.02 |
| 2011/0221367 A1* | 9/2011 | Perisic et al. ............ 318/400.02 |
| 2011/0221368 A1* | 9/2011 | Yabuguchi ............... 318/400.02 |
| 2011/0221382 A1* | 9/2011 | Hayashi ........................ 318/801 |
| 2011/0241578 A1* | 10/2011 | Kim et al. ................ 318/400.02 |
| 2011/0248656 A1* | 10/2011 | Yabuguchi et al. ...... 318/400.02 |

* cited by examiner

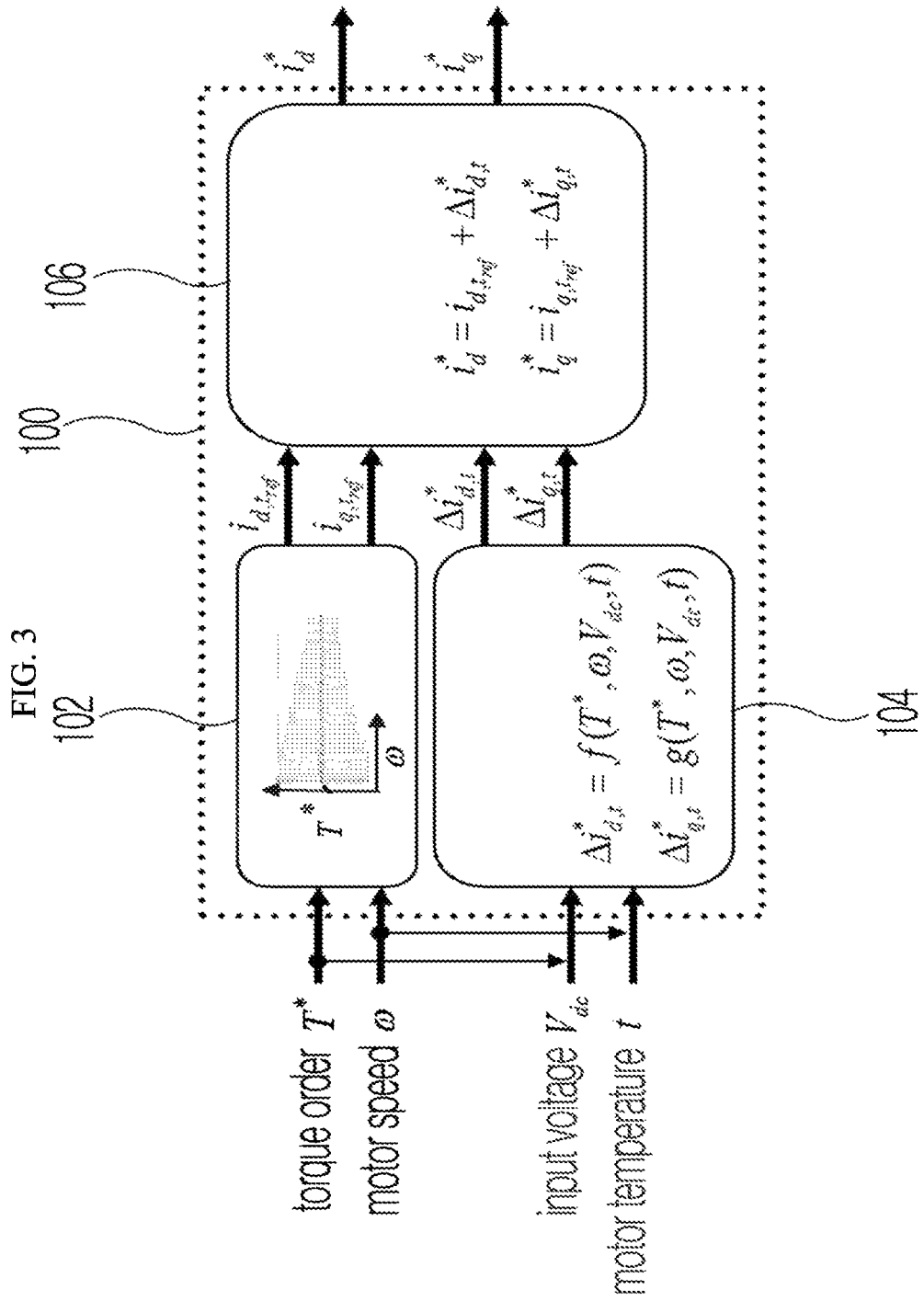

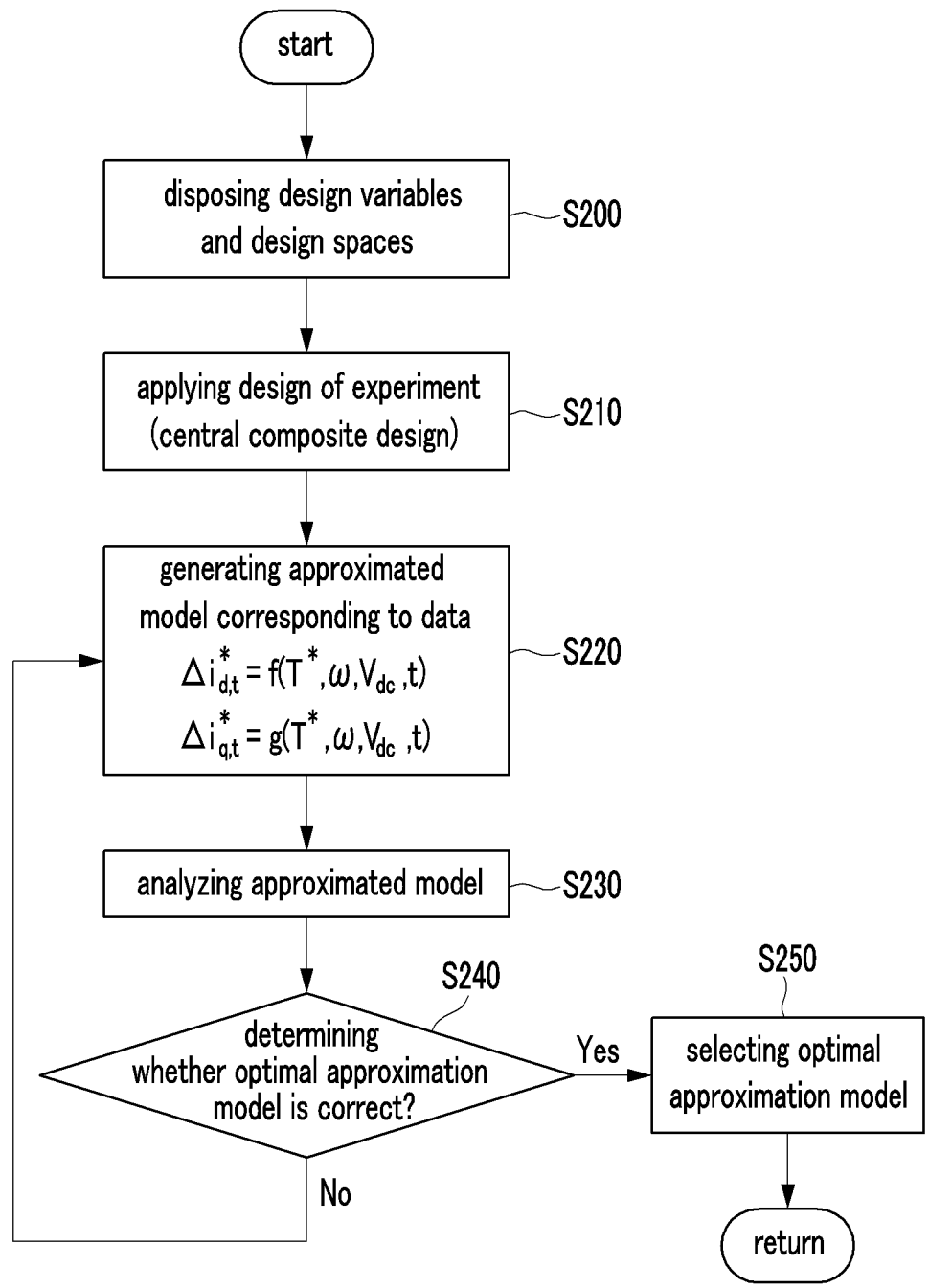

SYSTEM FOR CONTROLLING MOTOR OF HYBRID VEHICLE

CROSS-REFERENCE TO RELATED APPLICATION

This application claims priority to and the benefit of Korean Patent Application No. 10-2010-0123712 filed in the Korean Intellectual Property Office on Dec. 6, 2010, the entire contents of which are incorporated herein by reference.

BACKGROUND OF THE INVENTION (a) Field of the Invention

The present invention relates to a system for controlling a motor of a hybrid vehicle. More particularly, the present invention relates to a system for controlling a motor of a hybrid vehicle that can secure robustness and stability of control by selecting an optimal approximation model according to a driving condition of the motor and determining current order for controlling the motor by using the selected optimal approximation model.

(b) Description of the Related Art

Recently, environmentally-friendly vehicles such as hybrid vehicles and electric vehicles have attracted increasing attention due to energy depletion and environmental pollution. These environmentally-friendly vehicles typically include a motor generating driving torque by using electrical current from a battery. According to a conventional method for controlling the motor, a demand torque according to the current driving conditions of the vehicle is calculated and an operating current for generating and producing the demand torque is calculated so that the operating current can be applied to the motor.

However, operation of the motor is greatly affected by the motor temperature and an inverter voltage (i.e., input voltage). Therefore, the operating current is generally corrected according to the motor temperature and the inverter voltage. That is, the operating current is primarily corrected by the motor temperature and is secondarily corrected by the inverter voltage.

According to a conventional method that corrects the operating current according to the motor temperature, a map according to the driving condition of the vehicle is set at every reference temperature of the motor, and a compensation value of the operating current is calculated by substituting the driving condition of the vehicle into the map that corresponds to a respective reference temperature. If the motor temperature is not a predetermined reference temperature, the first and second reference temperatures closest to the motor temperature are selected, compensation values of the first and second operating currents are calculated from the maps according to the first and second reference temperatures, and the compensation value of the operating current is calculated from the compensation values of the first and second operating currents by interpolation.

Since one map is required at each reference temperature according to a conventional method that primarily corrects the operating current using the motor temperature, a plurality of maps are created so as to secure control reliability. Therefore, since a great many experiments are performed and a significant amount of time is required to create these maps, development costs are higher than most manufactures would like.

Even further, according to a conventional method that secondarily corrects the operating current by the inverter voltage, a motor speed is normalized according to the inverter input voltage and the compensation value of the current is calculated according to the normalized motor speed. Since voltage usage efficiency of the motor, however, is changed according to a load condition of the vehicle, control reliability may be deteriorated. In order to secure control reliability, weight value according to the load condition of the vehicle should be calculated as well.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for controlling a motor of a hybrid vehicle having advantages of reducing development cost and securing reliability and stability of control by selecting one optimal approximation model according to a driving condition of a motor and determining a current order for controlling the motor by using the selected optimal approximation model.

A system for controlling a motor of a hybrid vehicle according to an exemplary embodiment of the present invention may include: a current order generator determining currents of a first and second axes according to a driving condition; a current controller generating voltages of the first and second axes by using the currents of the first and second axes determined by the current order generator and feedback currents of the first and second axes; a coordinate transformer converting the voltages of the first and second axes into 3-phase voltage, and converting 3-phase feedback current into the feedback currents of the first and second axes and transmitting the feedback currents of the first and second axes to the current controller; a signal generator receiving the 3-phase voltage from the coordinate transformer and generating 3-phase signal corresponding thereto; a pulse-width modulation (PWM) inverter generating 3-phase current based on the 3-phase signal, and transmitting the 3-phase current to the coordinate transformer as the 3-phase feedback current; a motor driven by receiving the 3-phase current from the PWM inverter; and a resolver detecting a phase of the motor and transmitting detected the phase of the motor to the current order generator and the coordinate transformer. More specifically, the current order generator has a reference current determination module that is configured to determine reference currents of the first and second axes, a compensation value determination module that is configured to determine compensation values of the reference currents of the first and second axes, and a current determination module that is configured to determine the currents of the first and second axes from the reference currents of the first and second axes and the compensation values of the reference currents of the first and second axes.

In some embodiments of the present invention, the reference current determination module may determine the reference currents of the first and second axes from a demand torque at a current driving condition and a current speed of the motor. The compensation value determination module may determine the compensation values of the reference currents of the first and second axes from the demand torque associated with the current driving condition, the current speed of the motor, an input voltage, and a current temperature of the motor. The compensation value determination module may also determine the compensation values of the reference currents of the first and second axes based on an optimal approximation model. The optimal approximation model may be selected by design of experiment.

A system for controlling a motor of a hybrid vehicle according to another exemplary embodiment of the present invention may determine a current of a first axis and a current of a second axis according to a driving condition, may convert the currents of the first and second axes into a 3-phase AC current, and may drive the motor by applying the 3-phase AC current to the motor. The system may include: a reference current determination module that is configured to determine the reference currents of the first and second axes from a demand torque at a current driving condition and a current speed of the motor; a compensation value determination module that is configured to determine compensation values of the reference currents of the first and second axes based on an optimal approximation model; and a current determination module that is configured to determine the currents of the first and second axes from the reference currents of the first and second axes and the compensation values of the reference currents of the first and second axes.

The compensation value determination module may determine the compensation values of the reference currents of the first and second axes by substituting the demand torque at the current driving condition, the current speed of the motor, an input voltage, and a current temperature of the motor into the optimal approximation model. Again, the optimal approximation model may be selected by design of experiment.

BRIEF DESCRIPTION OF THE DRAWINGS

FIG. 3 is a schematic diagram of a current order generator in a system for controlling a motor of a hybrid vehicle according to an exemplary embodiment of the present invention.

FIG. 4 is a flowchart illustrating processes for selecting an optimal approximation model according to an exemplary embodiment of the present invention.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

An exemplary embodiment of the present invention will hereinafter be described in detail with reference to the accompanying drawings.

Figure 1:
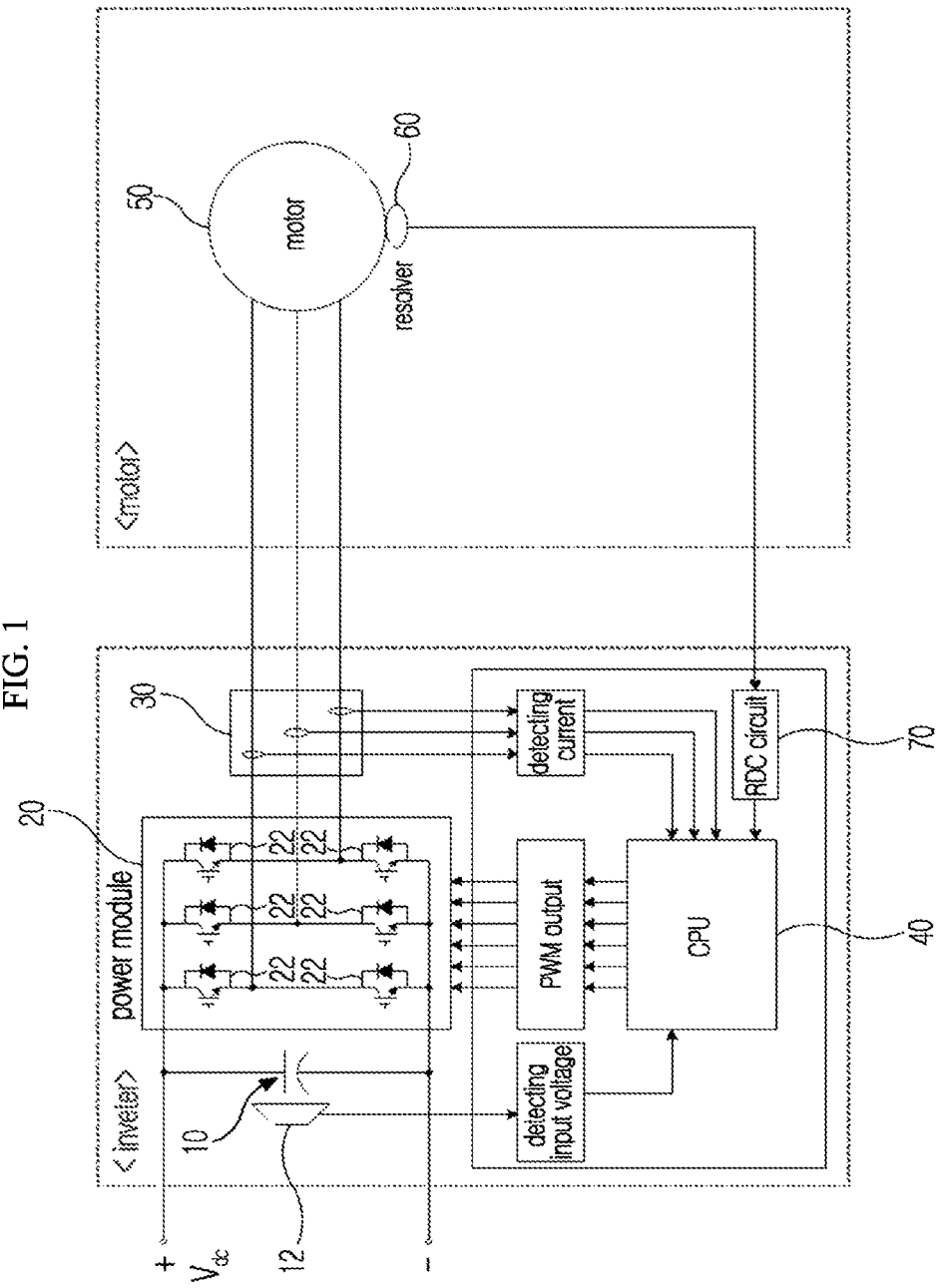
FIG. 1 is a schematic diagram of a motor system in a hybrid vehicle according to an exemplary embodiment of the present invention.

FIG. 1 is a schematic diagram of a motor system in a hybrid vehicle according to an exemplary embodiment of the present invention.

As shown in FIG. 1, a motor system of a hybrid vehicle according to an exemplary embodiment of the present invention includes an inverter module and a motor 50.

The inverter module receives a DC voltage $V_{dc}$ of a battery, determines a current according to a driving condition of a vehicle, and applies the determined current to the motor 50. For these purposes, the inverter module includes a capacitor 10, a power module 20, a CPU 40, and an RDC circuit 70.

The capacitor 10 is connected to both ends of the battery and protects the power module 20 by preventing the voltage of the battery from being directly applied to the power module 20. A voltmeter 12 detects the DC voltage $V_{dc}$ of the battery applied to the capacitor 10 and delivers a signal corresponding thereto to the CPU 40.

The power module 20 includes a plurality of switching elements 22. The power module 20 converts the DC voltage of the battery into a 3-phase AC current by operations of the switching elements 22, and applies the 3-phase AC current to the motor 50. An ammeter 30 detects the converted 3-phase AC current and delivers a signal corresponding thereto to the CPU 40.

The CPU 40 generates a pulse width modulation (PWM) signal for controlling the switching elements 22 according to the driving condition of the vehicle and applies the PWM signal to the power module 20. The driving condition of vehicle includes but is not limited to a demand torque, the DC voltage of the battery, a speed of the motor 50, and a temperature of the motor 50.

The RDC circuit 70 calculates the speed of the motor 50 by receiving a signal corresponding to a phase of the motor 50 and delivers a signal corresponding to the calculated speed of the motor 50 to the CPU 40. The motor 50 receives the 3-phase AC current from the power module 20, and thereby operates. A resolver 60 is mounted at the motor 50. The resolver 60 detects the phase (rotating angle) of the motor 50, and delivers the detected phase of the motor 50 to the RDC circuit 70.

Figure 2:
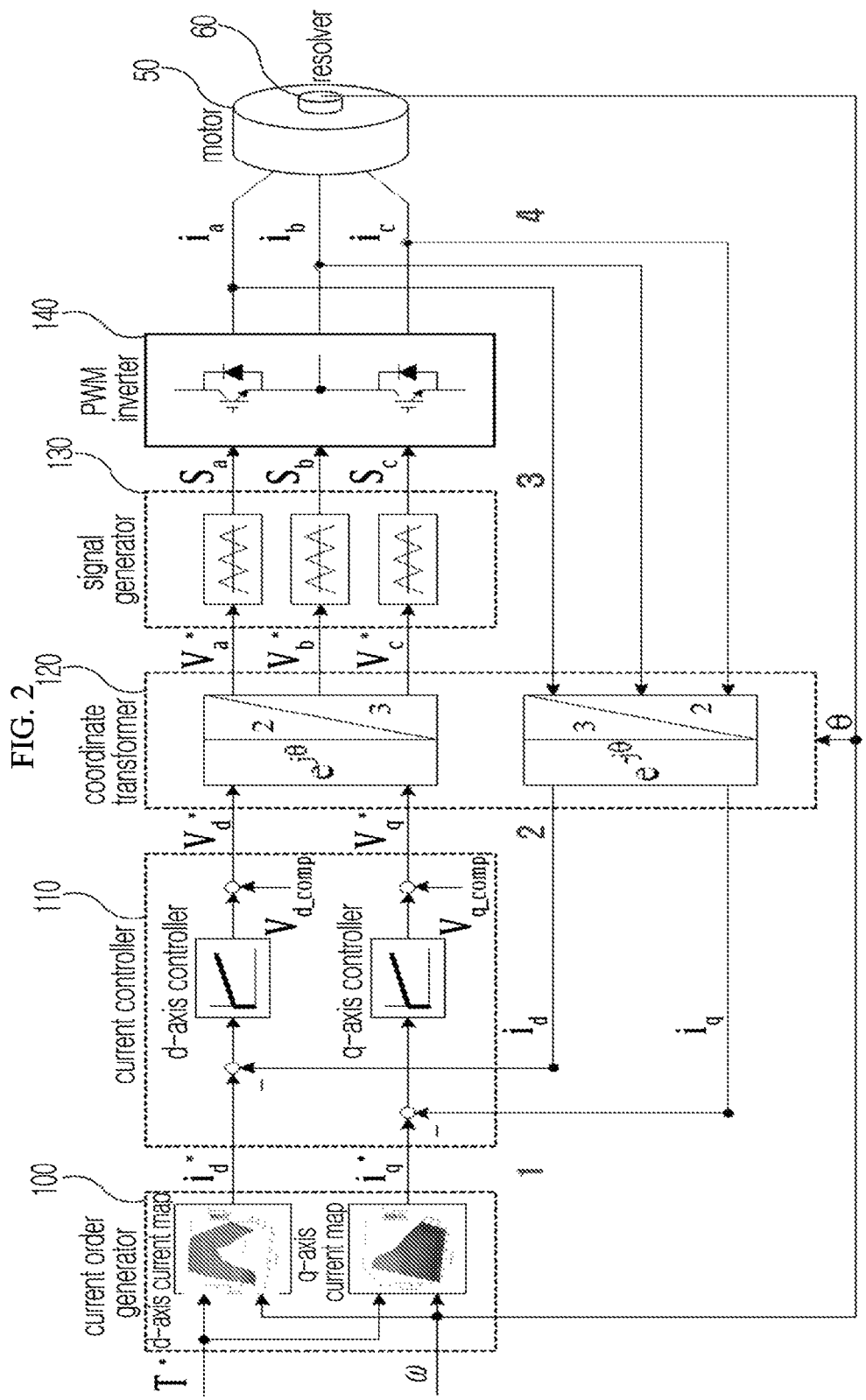
FIG. 2 is a schematic diagram of a system for controlling a motor of a hybrid vehicle according to an exemplary embodiment of the present invention.

FIG. 2 is a schematic diagram of a system for controlling a motor of a hybrid vehicle according to an exemplary embodiment of the present invention.

As shown in FIG. 2, a system for controlling a motor of a hybrid vehicle according to an exemplary embodiment of the present invention includes a current order generator 100, a current controller 110, a coordinate transformer 120, a signal generator 130, a PWM inverter 140, the motor 50, and the resolver 60.

The current order generator 100 determines a d-axis current and a q-axis current according to the driving condition of the vehicle. For this purpose, the current order generator 100 has a d-axis current map and a q-axis current map. Therefore, if a torque T* demanded by a current driving condition and a current speed ω of the motor 50 are input into the current order generator 100, the current order generator 100 calculates the d-axis current $i_d^*$ and the q-axis current $i_q^*$ corresponding to the torque and the speed of the motor.

The current controller 110 calculates a d-axis voltage $V_d^*$ and a q-axis voltage $V_q^*$ by using the d-axis current $i_d^*$ and the q-axis current $i_q^*$ delivered from the current order generator 100 and a d-axis feedback current $i_d$ and a q-axis feedback current $i_q$. The coordinate transformer 120 receives the d-axis voltage $V_d^*$ and the q-axis voltage $V_q^*$ from the current controller 110 and converts the d-axis voltage $V_d^*$ and the q-axis voltage $V_q^*$ into 3-phase AC voltages $V_a^*$, $V_b^*$, and $V_c^*$. In addition, the coordinate transformer 120 receives 3-phase AC currents $i_a$, $i_b$, and $i_c$ applied to the motor 50 as the feedback currents and converts the 3-phase AC currents $i_a$, $i_b$, and $i_c$ into the d-axis feedback current $i_d$ and the q-axis feedback current $i_q$.

The signal generator 130 receives the 3-phase AC voltages $V_a^*$, $V_b^*$, and $V_c^*$ from the coordinate transformer 120 and converts the 3-phase AC voltages $V_a^*$, $V_b^*$, and $V_c^*$ into 3-phase switching signals $S_a$, $S_b$, and $S_c$. The PWM inverter 140 includes a plurality of switching elements. The PWM inverter 140 receives the 3-phase switching signal $S_a$, $S_b$, and $S_c$ from the signal generator 130 and converts the 3-phase switching signal $S_a$, $S_b$, and $S_c$ into the 3-phase AC current $i_a$, $i_b$, and $i_c$. Accordingly, the motor 50 is driven by receiving the 3-phase AC current $i_a$, $i_b$, and $i_c$ from the PWM inverter 140. The resolver 60 is mounted at the motor 50. The resolver 60 detects the phase of the motor 50, and delivers a signal corresponding thereto to the coordinate transformer 120 and the current order generator 100.

FIG. 3 is a schematic diagram of a current order generator in a system for controlling a motor of a hybrid vehicle according to an exemplary embodiment of the present invention.

As shown in FIG. 3, the current order generator 100 includes a reference current determination module 102, a compensation value determination module 104, and a current determination module 106.

The reference current determination module 102 determines a d-axis reference current $i_{d,tref}$ and a q-axis reference current $i_{q,tref}$ from the demand torque T* at the current driving condition and the current speed ω of the motor 50. For this purpose, the reference current determination module 102 includes a map in which the d-axis reference current $i_{d,tref}$ and the q-axis reference current $i_{q,tref}$ according to the demand torque T* for the current driving condition and the current speed ω of the motor 50 are stored.

The compensation value determination module 104 determines the compensation value of the reference current of the d-axis $\Delta i^*_{d,t}$ and the compensation value of the reference current of the q-axis $\Delta i^*_{q,t}$ from the demand torque at the current driving condition T*, the current speed of the motor 50 ω, the input voltage (the DC voltage $V_{dc}$ of the battery), and the current temperature t of the motor 50. For this purpose, an optimal approximation model is stored in the compensation value determination module 104. Referring to FIG. 4, processes for selecting the optimal approximation model will be described in detail.

FIG. 4 is a flowchart illustrating processes for selecting an optimal approximation model according to an exemplary embodiment of the present invention.

As shown in FIG. 4, a system or designer disposes design variables and design spaces at a step S200. The design variables includes the demand torque at a current driving condition T*, the current speed of the motor 50 ω, the input voltage (the DC voltage $V_{dc}$ of the battery), and the current temperature t of the motor 50, the design spaces represents driving regions of the vehicle. After that, the designer applies design of experiment by using the design variables and the design spaces at a step S210. Herein, a central composite design is used as the design of experiment. The design of experiment and the central composite design are well-known to a person of an ordinary skill in the art, and thus detailed description thereof will be omitted in this specification.

If data is obtained by performing experiments according to the central composite design, the system or the designer generates an approximated model corresponding to the data at a step S220. After that, the experiments are done again so as to obtain new data, and the data is substituted into the approximated model by the system so as to verify suitability of the approximated model at a step S230. Subsequently, the system/designer determines whether the approximated model is the optimal approximation model at a step S240.

If the approximated model is not the optimal approximation model, the system/designer returns to the S220 and generates another approximated model. If the approximated model is the optimal approximation model, the designer stores the optimal approximation model in the compensation value determination module 104 at a step S250.

The current determination module 106 determines the d-axis current id* and the q-axis current iq* from the d-axis reference current $i_{d,tref}$ and the q-axis reference current $i_{q,tref}$ determined by the reference current determination module 102 and the compensation value of the reference current of the d-axis $\Delta i^*_{d,t}$ and the compensation value of the reference current of the q-axis $\Delta i^*_{q,t}$ determined by the compensation value determination module 104. The d-axis current id* and the q-axis current iq* are delivered to the current controller 110.

Furthermore, the present invention may be embodied as computer readable media on a computer readable medium containing executable program instructions executed by a processor. Examples of the computer readable mediums include, but are not limited to, ROM, RAM, compact disc (CD)-ROMs, magnetic tapes, floppy disks, and optical data storage devices. The computer readable recording medium can also be distributed in network coupled computer systems so that the computer readable media is stored and executed in a distributed fashion.

As described above, an optimal driving of the hybrid vehicle may be provide by calculating a current order for operating a motor considering of all the factors that can affect an operation of the motor according to an exemplary embodiment of the present invention. Accordingly, fuel economy of the vehicle may improve and reliability and stability of control may also improve. Since one optimal approximation model is produced by design of experiment, particularly by central composite design instead of producing a plurality of maps, developing time may be shortened and developing cost may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling a motor of a hybrid vehicle, comprising:
   a current order generator determining currents of a first axis and a second axis according to a driving condition;
   a current controller generating voltages of the first and second axes by using the currents of the first and second axes determined by the current order generator and feedback currents of the first and second axes;
   a coordinate transformer converting the voltages of the first and second axes into 3-phase voltage, and converting 3-phase feedback current into the feedback currents of the first and second axes and transmitting the feedback currents of the first and second axes to the current controller;

a signal generator receiving the 3-phase voltage from the coordinate transformer and generating 3-phase signal corresponding thereto;

a PWM inverter generating 3-phase current based on the 3-phase signal, and transmitting the 3-phase current to the coordinate transformer as the 3-phase feedback current;

a motor driven by receiving the 3-phase current from the PWM inverter; and a resolver detecting phase of the motor and transmitting the phase of the motor to the current order generator and the coordinate transformer, wherein the current order generator comprises a reference current determination module determining reference currents of the first and second axes, a compensation value determination module determining compensation values of the reference currents of the first and second axes, and a current determination module determining the currents of the first and second axes from the reference currents of the first and second axes and the compensation values of the reference currents of the first and second axes.

2. The system of claim 1, wherein the reference current determination module determines the reference currents of the first and second axes from a demand torque at a current driving condition and a current speed of the motor.

3. The system of claim 1, wherein the compensation value determination module determines the compensation values of the reference currents of the first and second axes from the demand torque at the current driving condition, the current speed of the motor, an input voltage, and a current temperature of the motor.

4. The system of claim 1, wherein the compensation value determination module determines the compensation values of the reference currents of the first and second axes based on an optimal approximation model.

5. A system for controlling a motor of a hybrid vehicle that determines a current of a first axis and a current of a second axis according to a driving condition, converts the currents of the first and second axes into a 3-phase AC current, and drives the motor by applying the 3-phase AC current to the motor, the system comprising:

a processor configured to execute one or more processes that control the motor; and a memory configured to store the one or more processes executed by the processor where the processes determine reference currents of the first and second axes from a demand torque at a current driving condition and a current speed of the motor;

determine compensation values of the reference currents of the first and second axes based on an optimal approximation model; and determine the currents of the first and second axes from the reference currents of the first and second axes and the compensation values of the reference currents of the first and second axes, wherein the processor is configured to determine the compensation values of the reference currents of the first and second axes by substituting the demand torque at the current driving condition, the current speed of the motor, an input voltage, and a current temperature of the motor into the optimal approximation model to control the motor of the hybrid vehicle.

6. A non-transitory computer readable medium for controlling a motor in a hybrid vehicle containing executable program instructions executed by a controller including a processor and a memory, comprising:

program instructions that determine reference currents of a first axis and a second axis from a demand torque at a current driving condition and a current speed of the motor;

program instructions that determine compensation values of the reference currents of the first and second axes based on an optimal approximation model, and substitute the demand torque at the current driving condition, the current speed of the motor, an input voltage, and a current temperature of the motor into the optimal approximation model; and program instructions that determine the currents of the first and second axes from the reference currents of the first and second axes and the compensation values of the reference currents of the first and second axes; and program instructions that apply the determined currents of the first and second axes to the motor in the hybrid vehicle.

7. A method for controlling a motor in a hybrid vehicle comprising:

determining, by a processor, reference currents of a first axis and a second axis from a demand torque at a current driving condition and a current speed of the motor;

determining, by the processor, compensation values of the reference currents of the first and second axes based on an optimal approximation model; and determining, by the processor, the currents of the first and second axes from the reference currents of the first and second axes and the compensation values of the reference currents of the first and second axes, wherein determining the compensation values of the reference currents of the first and second axes further comprises substituting the demand torque at the current driving condition, the current speed of the motor, an input voltage, and a current temperature of the motor into the optimal approximation model.

* * * * *